(12) United States Patent
Choi et al.

(10) Patent No.: US 12,548,623 B2
(45) Date of Patent: Feb. 10, 2026

(54) MEMORY DEVICE AND OPERATING METHOD THEREOF

(71) Applicant: SK hynix Inc., Icheon-si (KR)

(72) Inventors: Hyung Jin Choi, Icheon-si (KR); Se Chun Park, Icheon-si (KR); Chan Hui Jeong, Icheon-si (KR)

(73) Assignee: SK hynix Inc., Icheon-si (KR)

(*) Notice: Subject to any disclaimer, the term of this patent is extended or adjusted under 35 U.S.C. 154(b) by 186 days.

(21) Appl. No.: 18/352,963

(22) Filed: Jul. 14, 2023

(65) Prior Publication Data

US 2024/0304249 A1 Sep. 12, 2024

(30) Foreign Application Priority Data

Mar. 8, 2023 (KR) .................. 10-2023-0030484

(51) Int. Cl.
*G11C 16/10* (2006.01)
*G11C 11/56* (2006.01)
*G11C 16/04* (2006.01)
*G11C 16/08* (2006.01)
*G11C 16/24* (2006.01)
*G11C 16/34* (2006.01)

(52) U.S. Cl.
CPC .......... *G11C 16/10* (2013.01); *G11C 11/5628* (2013.01); *G11C 16/0483* (2013.01); *G11C 16/08* (2013.01); *G11C 16/24* (2013.01); *G11C 16/3459* (2013.01)

(58) Field of Classification Search
CPC . G11C 16/10; G11C 11/5628; G11C 16/0483; G11C 16/08; G11C 16/24; G11C 16/3459
See application file for complete search history.

(56) References Cited

U.S. PATENT DOCUMENTS

| | | | |
|---|---|---|---|
| 6,894,929 B2 | 5/2005 | Matsuoka et al. | |
| 9,824,761 B2* | 11/2017 | Kwak | G11C 16/10 |
| 2010/0061148 A1* | 3/2010 | Komatsu | G11C 16/24 |
| | | | 365/185.23 |
| 2011/0194346 A1* | 8/2011 | Yoon | G11C 16/3459 |
| | | | 365/185.03 |
| 2015/0348633 A1* | 12/2015 | Song | G11C 11/5628 |
| | | | 365/185.19 |
| 2019/0311772 A1* | 10/2019 | Diep | G11C 16/08 |
| 2020/0194078 A1* | 6/2020 | Kondo | G11C 16/10 |
| 2022/0076754 A1* | 3/2022 | Choi | G11C 11/5628 |

(Continued)

FOREIGN PATENT DOCUMENTS

KR 1020170065240 A 6/2017
KR 1020190000562 A 1/2019

*Primary Examiner* — Amir Zarabian
*Assistant Examiner* — Justin Bryce Heisterkamp
(74) *Attorney, Agent, or Firm* — WILLIAM PARK AND ASSOCIATES LTD.

(57) ABSTRACT

A memory device may include memory cells connected to a selected word line, and a peripheral circuit configured to store information regarding a foggy program pass loop in which a target program state is determined as foggy program pass during a foggy program operation on the selected word line, calculate a fine program pass loop based on the foggy program pass loop, and determine the target program state as fine program pass in the fine program pass loop of a fine program operation on the selected word line.

17 Claims, 10 Drawing Sheets

(56) References Cited

U.S. PATENT DOCUMENTS

| | | | |
|---|---|---|---|
| 2022/0199165 A1* | 6/2022 | Nguyen | G11C 16/26 |
| 2022/0230685 A1* | 7/2022 | Alrod | G11C 11/5671 |
| 2023/0112849 A1* | 4/2023 | Kim | G11C 11/5628 |
| | | | 365/185.03 |
| 2024/0006004 A1* | 1/2024 | Li | G11C 16/08 |
| 2024/0028216 A1* | 1/2024 | Choi | G11C 11/5671 |
| 2024/0053903 A1* | 2/2024 | Noda | G11C 11/5628 |
| 2024/0112738 A1* | 4/2024 | Huang | G11C 16/102 |
| 2024/0145009 A1* | 5/2024 | Noh | G11C 16/102 |
| 2024/0221802 A1* | 7/2024 | Venugopal | G11C 7/1069 |

* cited by examiner

MEMORY DEVICE AND OPERATING METHOD THEREOF

CROSS-REFERENCES TO RELATED APPLICATION

The present application claims priority under 35 U.S.C. § 119(a) to Korean application number 10-2023-0030484 filed on Mar. 8, 2023, in the Korean Intellectual Property Office, which is incorporated herein by reference in its entirety.

BACKGROUND

1. Technical Field

The present technology relates to a memory device.

2. Related Art

A volatile memory device is a memory device in which stored data is lost when power supply is cut off. A non-volatile memory device is a memory device in which stored data is retained even though power supply is cut off. When a program operation is performed to store data in a memory device, interference may occur between memory cells included in the memory device. In addition, execution time and power consumption of the program operation may be related to operating performance of the memory device. Accordingly, various program methods are being developed in order to reduce an interference effect between memory cells and improve performance of the program operation.

SUMMARY

A memory device according to an embodiment of the present technology may include memory cells connected to a selected word line; and a peripheral circuit configured to store information regarding a foggy program pass loop in which a target program state is determined as foggy program pass during a foggy program operation on the selected word line, calculate a fine program pass loop based on the foggy program pass loop, and determine the target program state as "fine program pass" in the fine program pass loop of a fine program operation on the selected word line.

A memory device according to an embodiment of the present technology may include memory cells connected to a selected word line; and a peripheral circuit configured to store information regarding a foggy program pass loop in which a target program state is determined as foggy program pass during a foggy program operation on the selected word line, determine a fine program pass voltage based on the foggy program pass loop, and determine the target program state as "fine program pass" after applying the fine program pass voltage to the selected word line during a fine program operation on the selected word line.

An operating method of a memory device according to an embodiment of the present technology may include storing information regarding a foggy program pass loop in which a target program state is determined as foggy program pass during a foggy program operation on a selected word line; determining a fine program pass condition based on the foggy program pass loop; and determining the target program state as "fine program pass" when the fine program pass condition is satisfied during a fine program operation on the selected word line.

DETAILED DESCRIPTION

Hereinafter, embodiments of the present technology will be described in more detail with reference to the accompanying drawings.

Various embodiments of the present technology are directed to a memory device that performs a program operation with improved performance, and an operating method of the memory device.

A memory device and an operating method thereof according to embodiments of the present technology may perform a program operation with improved performance.

Figure 1:
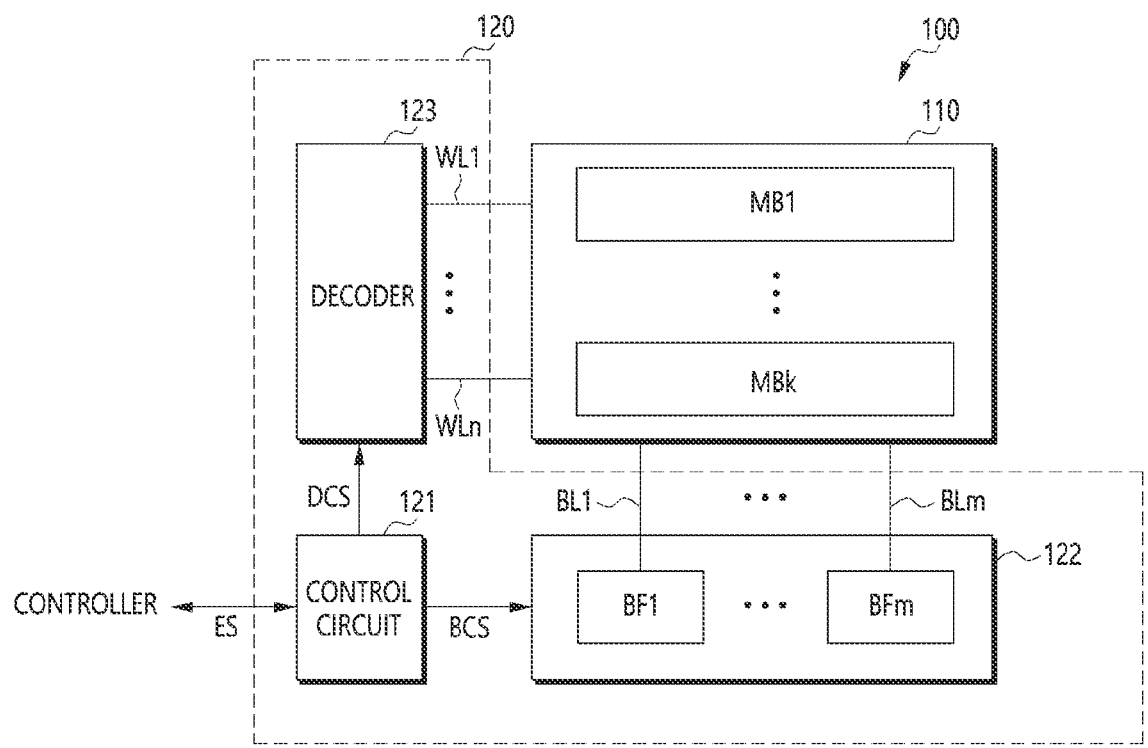
FIG. 1 is a block diagram illustrating a memory device, according to an embodiment of the present technology.

FIG. 1 is a block diagram illustrating a memory device 100, according to an embodiment of the present technology.

Referring to FIG. 1, the memory device 100 may operate under the control of an external controller. An operation of the memory device 100 may include a read operation, a program operation, and an erase operation.

The memory device 100 may include various types of memory, such as NAND flash memory, 3D NAND flash memory, NOR flash memory, resistive random access memory (RRAM), phase-change memory (PRAM), magneto-resistive random access memory (MRAM), ferroelectric random access memory (FRAM), or spin transfer torque random access memory (STT-RAM).

The memory device 100 may include a memory cell array 110 and a peripheral circuit 120.

The memory cell array 110 may include a plurality of memory blocks MB1 to MBk. A memory block may be a unit in which the memory device 100 performs an erase operation. That is, data stored in the memory block may be simultaneously erased. Each of the memory blocks MB1 to MBk may include a plurality of memory cells in which data is stored. Each of the memory cells may be configured to be present in any one of an erase state and a plurality of program states according to stored data. The memory cells may be arranged to be parallel to the substrate in a two-dimensional structure or may be arranged to be vertically stacked in relation to the substrate in a three-dimensional structure.

The peripheral circuit 120 may perform a program operation, a read operation, and an erase operation on the memory cell array 110 under the control of the controller. The peripheral circuit 120 may receive external signals ES including commands, addresses, and data from the controller and may perform internal operations of the memory device 100 in response to the external signals ES.

The peripheral circuit 120 may perform the program operation on a selected word line by dividing the program operation into a foggy program operation and a fine program operation. The peripheral circuit 120 may store information regarding a foggy program pass loop in which a target program state is determined as "a foggy program pass" during the foggy program operation on the selected word line. In addition, the peripheral circuit 120 may determine a fine program pass condition based on the foggy program pass loop. Furthermore, the peripheral circuit 120 may determine the target program state as "fine program pass" when satisfying the fine program pass condition during the fine program operation on the selected word line.

According to an embodiment, the determining of the fine program pass condition may include calculating a fine program pass loop. In this case, the satisfying of the fine program pass condition may include performing the fine program pass loop during the fine program operation. After performing the fine program pass loop in the fine program operation on the selected word line, the peripheral circuit 120 may determine the target program state as "fine program pass".

According to an embodiment, after applying a fine program voltage to the selected word line in the fine program pass loop, the peripheral circuit 120 may determine the target program state as "fine program pass" regardless of a result of an operation that applies a fine verification voltage that verifies the target program state.

According to an embodiment, after applying the fine program voltage in the fine program pass loop, the peripheral circuit 120 may determine the target program state as "fine program pass" without applying the fine verification voltage that verifies the target program state to the selected word line.

According to an embodiment, the determining of the fine program pass condition may include calculating a fine program pass voltage. In this case, the satisfying of the fine program pass condition may include applying the fine program pass voltage to the selected word line in the fine program operation. The peripheral circuit 120 may determine the target program state as "fine program pass" after applying the fine program pass voltage during the fine program operation on the selected word line.

The peripheral circuit 120 may include a control circuit 121, a buffer group 122, and a decoder 123.

The control circuit 121 may control overall operations of the memory device 100 according to the external signals ES transmitted from the controller. The control circuit 121 may generate buffer control signals BCS based on the external signals ES and may output the buffer control signals BCS to the buffer group 122. The control circuit 121 may generate decoder control signals DCS based on the external signals ES and may output the decoder control signals DCS to the decoder 123. The decoder control signals DCS may include program voltages and verification voltages having various levels, which are necessary for the program operation. Although not illustrated, the control circuit 121 may include an interface for communicating with the controller, and a voltage generation circuit for generating voltages having various voltage levels.

The buffer group 122 may be connected to the memory cell array 110 through bit lines BL1 to BLm. The buffer group 122 may include a plurality of buffer units BF1 to BFm connected to the bit lines BL1 to BLm, respectively. The plurality of buffer units BF1 to BFm may temporarily store program data to be stored in memory cells on which the program operation is to be performed (hereinafter referred to as target memory cells). The plurality of buffer units BF1 to BFm may simultaneously operate in response to the buffer control signals BCS, and thus, the program operation may be simultaneously performed on the target memory cells.

The decoder 123 may be connected to the memory cell array 110 through word lines WL1 to WLn. The decoder 123 may select a word line connected to the target memory cells (hereinafter referred to as a selected word line), among the word lines WL1 to WLn, according to the decoder control signals DCS and may apply the program voltages and verification voltages having various voltage levels to the selected word line.

Figure 2:
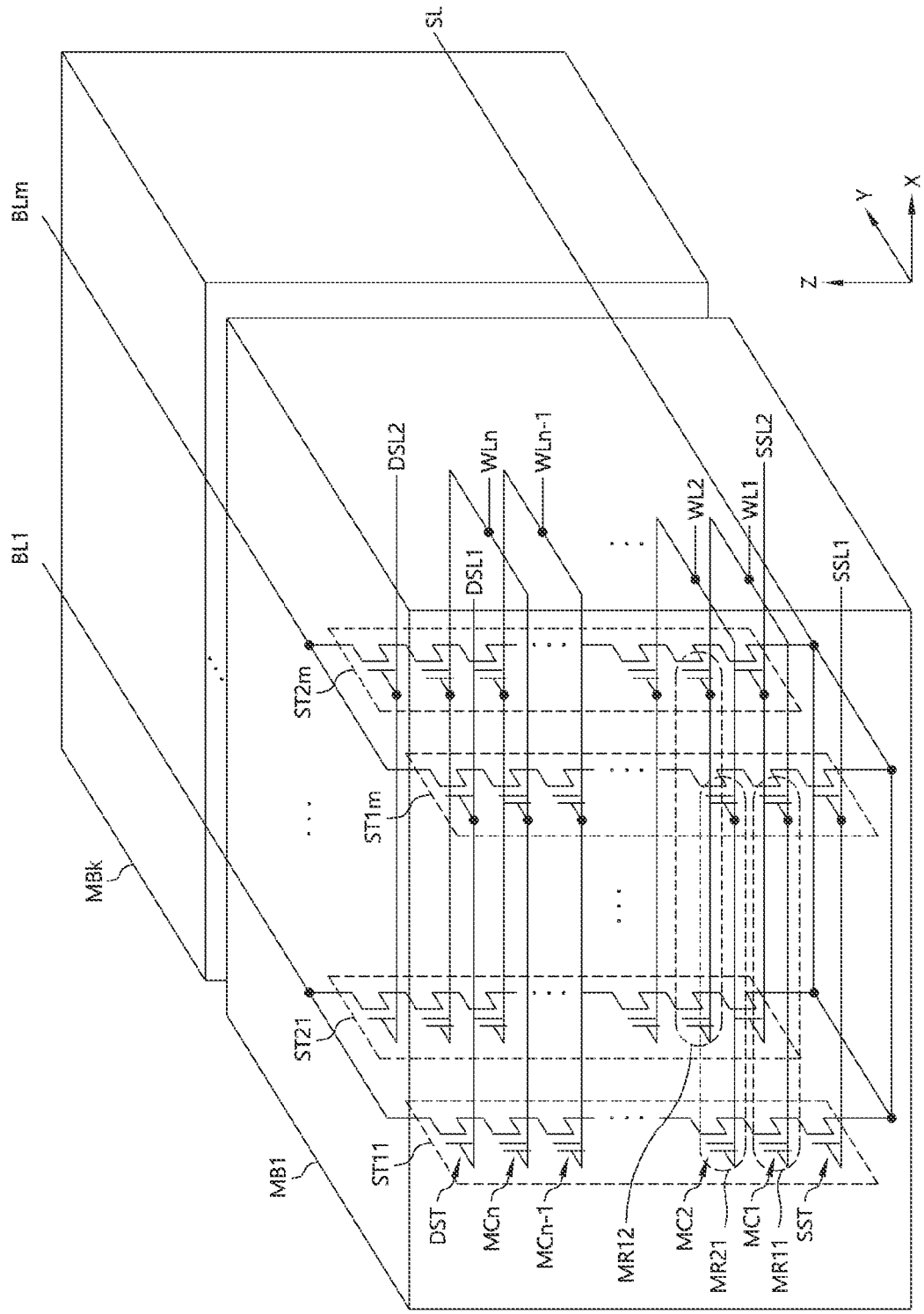
FIG. 2 is a circuit diagram illustrating a memory block, according to an embodiment of the present technology.

FIG. 2 is a circuit diagram illustrating the memory block MB1, according to an embodiment of the present technology. Each of the memory blocks MB1 to MBk included in the memory device 100 may be configured similarly to the memory block MB1 of FIG. 2.

Referring to FIG. 2, the memory block MB1 may include strings ST11 to ST1m and ST21 to ST2m. Each of the strings ST11 to ST1m and ST21 to ST2m may extend in a vertical direction, i.e., a Z direction. In the memory block MB1, m strings may be arranged in a row direction, i.e., an X direction. Although FIG. 2 illustrates that two strings are arranged in a column direction, i.e., a Y direction, this is for convenience in description, and three or more strings may be arranged in the column direction, i.e., the Y direction.

The strings ST11 to ST1m and ST21 to ST2m may be configured in the same manner. For example, the string ST11 may include a source selection transistor SST, memory cells MC1 to MCn, and a drain selection transistor DST, which are connected in series to one another between a source line SL and the bit line BL1. A source of the source selection transistor SST may be connected to the source line SL, and a drain of the drain selection transistor DST may be connected to the bit line BL1. The memory cells MC1 to MCn may be connected in series to one another between the source selection transistor SST and the drain selection transistor DST.

Gates of source selection transistors of strings, arranged in the same row, may be connected to the same source selection line. For example, gates of source selection transistors of the strings ST11 to ST1m, arranged in a first row, may be connected to a source selection line SSL1, and gates of source selection transistors of the strings ST21 to ST2m, arranged in a second row, may be connected to a source selection line SSL2. According to another embodiment, the source selection transistors of the strings ST11 to ST1m and ST21 to ST2m may be connected to one source selection line in common. According to another embodiment, the strings ST11 to ST1m and ST21 to ST2m may be grouped into two or more string groups, and different string groups may be connected to different source selection lines, respectively.

Gates of drain selection transistors of strings, arranged in the same row, may be connected to the same drain selection line. For example, gates of drain selection transistors of the strings ST11 to ST1m, arranged in the first row, may be connected to a drain selection line DSL1, and gates of drain selection transistors of the strings ST21 to ST2m, arranged in the second row, may be connected to a drain selection line DSL2.

Strings arranged in the same column may be connected to the same bit line. For example, the strings ST11 and ST21 arranged in a first column may be connected to the bit line BL1. When extrapolated, the strings ST1*m* and ST2*m* arranged in an m*th* column may be connected to the bit line BLm.

Gates of memory cells at the same position in the vertical direction may be connected to the same word line. For example, in the strings ST11 to ST1*m* and ST21 to ST2*m*, memory cells at the same position in the vertical direction as the memory cell MC1 may be connected to the word line WL1.

Among the memory cells, memory cells connected to the same word line in the same row may constitute one memory region. For example, memory cells connected to the word line WL1 in the first row may constitute one memory region MR11, and memory cells connected to the word line WL1 in the second row may constitute one memory region MR12. Furthermore, memory cells connected to the word line WL2 in the first row may constitute one memory region MR21. Each word line may be connected to a plurality of memory regions according to the number of rows. Memory cells constituting one memory region may be programmed simultaneously.

According to an embodiment, the memory block MB1 may be further connected to one or more dummy word lines other than the word lines WL1 to WLn. In this case, the memory block MB1 may further include dummy memory cells connected to the dummy word lines.

A memory cell storing 1 bit may be referred to as a single level cell (SLC), and a memory region and a memory block each including SLCs may be referred to as an SLC memory region and an SLC memory block, respectively. A memory cell storing a plurality of bits may be referred to as an x level cell (XLC), and a memory region and a memory block each including XLCs may be referred to as an XLC memory region and an XLC memory block, respectively.

One memory region including memory cells each storing k bits may logically include k sub-regions, that is, pages. For example, a multi-level cell (MLC) memory region may logically include two pages, that is, an LSB page or a page having the lowest level in which a least significant bit (LSB) is stored and an MSB page or a page having the highest level in which a most significant bit (MSB) is stored. For example, a TLC memory region may logically include three pages, that is, an LSB page in which an LSB is stored, a CSB page or a page having an intermediate level in which a central significant bit (CSB) is stored, and an MSB page in which an MSB is stored. Under the control of the controller, the memory device 100 may simultaneously perform the program operation on a plurality of pages included in one memory region.

Figure 3:
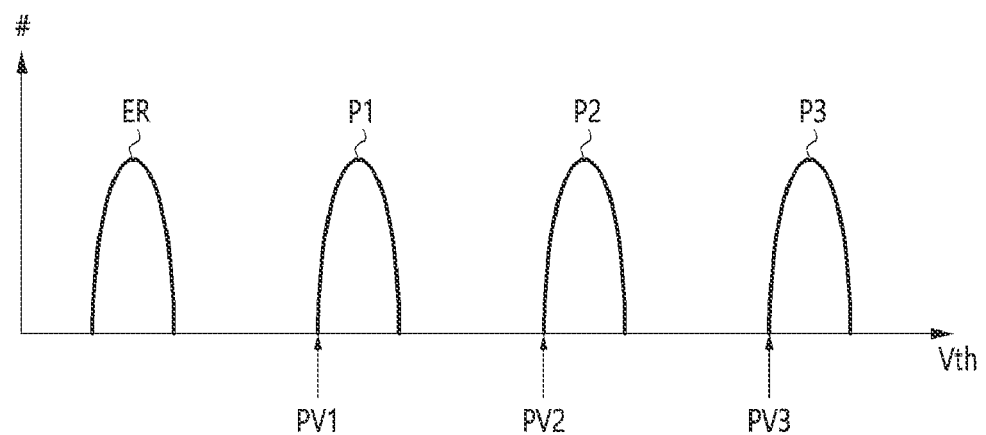
FIG. 3 is a diagram illustrating states of memory cells in which data is stored, according to an embodiment of the present technology.

FIG. 3 is a diagram illustrating states of memory cells in which data is stored, that is, an erase state ER and first to third program states P1 to P3, according to an embodiment of the present technology. In FIG. 3, a horizontal axis Vth may refer to a threshold voltage of a memory cell, and a vertical axis # may refer to the number of memory cells.

Referring to FIG. 3, a plurality of target memory cells connected to a selected word line in common may be present in the erase state ER before data is stored therein.

While the program operation is being performed, the target memory cells may receive a program voltage through the selected word line. Accordingly, threshold voltages of some of the target memory cells may increase, and the target memory cells may be programmed to the erase state ER and the first to third program states P1 to P3. The erase state ER and the first to third program states P1 to P3 may correspond to different data. When the target memory cells are MLCs, through the program operation, a total of four states may be formed as illustrated. According to an embodiment, a total of 2^x states may be formed when each memory cell stores x bits.

During the program operation, first to third verification voltages PV1 to PV3 may be applied to the selected word line in order to check whether the first to third program states P1 to P3 have been properly formed. For example, the first verification voltage PV1 may be applied to the selected word line to verify the first program state P1. When the first verification voltage PV1 is applied to the selected word line, a target memory cell having a threshold voltage lower than the first verification voltage PV1 may be turned on and may allow current to flow therethrough. However, when the first verification voltage PV1 is applied to the selected word line, a target memory cell having a threshold voltage higher than the first verification voltage PV1 may be turned off and may cut off the current. Among the buffer units BF1 to BFm of FIG. 1, a buffer unit connected to a target memory cell through a bit line may detect a voltage or current of the bit line, which is formed when the target memory cell is turned on or off, thereby storing a resultant value corresponding to a detection result. The control circuit 121 may determine the state of the target memory cell based on the resultant value stored in the buffer unit. When the control circuit 121 determines that the target memory cell, which is to be programmed to the first program state P1, has a threshold voltage higher than the first verification voltage PV1, the control circuit 121 may determine the corresponding target memory cell as "pass". On the other hand, when the control circuit 121 determines that the target memory cell, which is to be programmed to the first program state P1, has a threshold voltage lower than the first verification voltage PV1, the control circuit 121 may determine the corresponding target memory cell as "fail". When the number of target memory cells each having a threshold voltage lower than the first verification voltage PV1, among the target memory cells, which are to be programmed to the first program state P1, is lower than a predetermined number, the control circuit 121 may determine that the program operation has been completely performed on the first program state P1.

Figure 4:
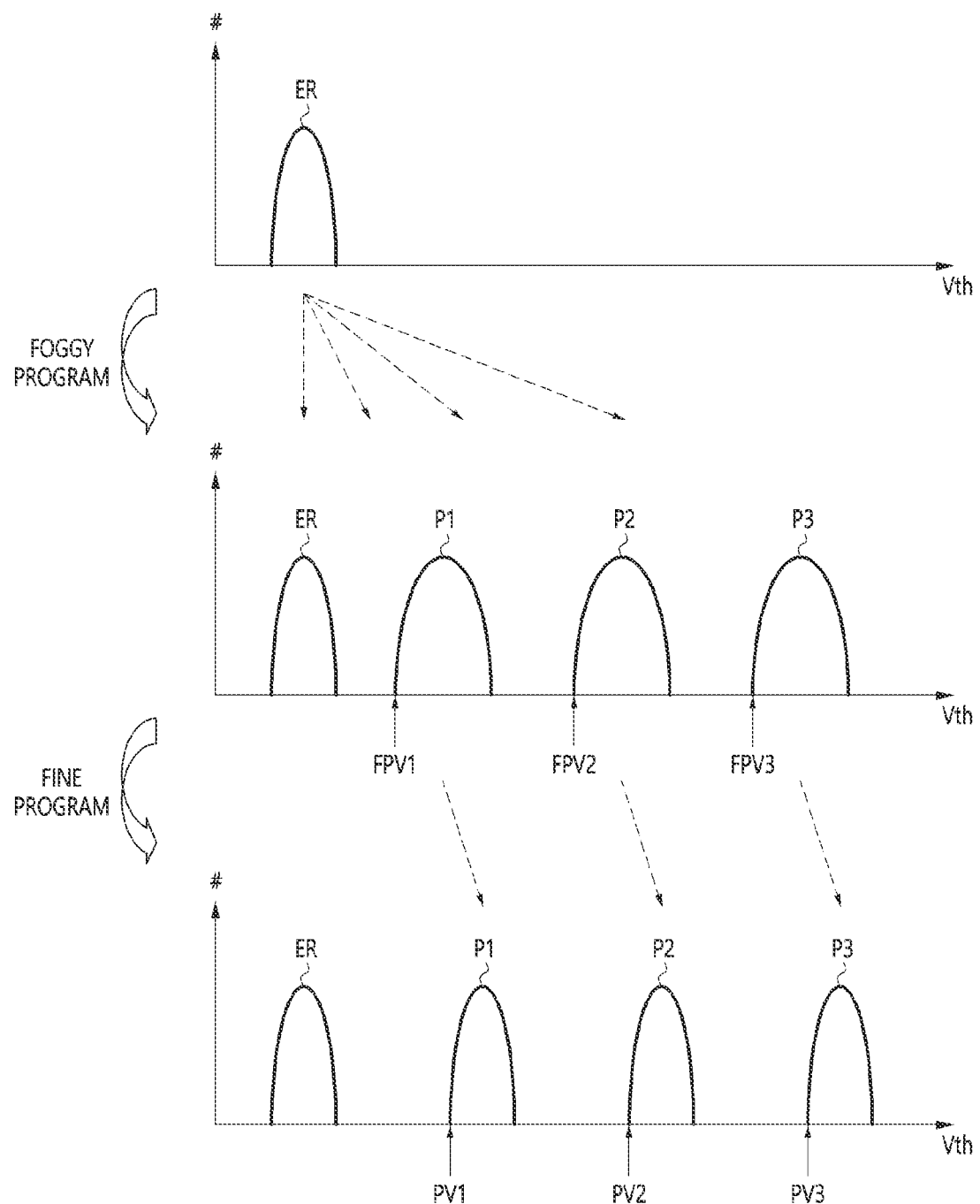
FIG. 4 is a diagram illustrating a foggy program operation and a fine program operation, according to an embodiment of the present technology.

FIG. 4 is a diagram illustrating the foggy program operation and the fine program operation, according to an embodiment of the present technology.

Referring to FIG. 4, the program operation performed on target memory cells may be divided into the foggy program operation and the fine program operation. The foggy program operation and fine program operation performed on the target memory cells may be continuous or discontinuous. For example, the foggy program operation may be performed on other memory cells, other than the target memory cells, between the foggy program operation and the fine program operation on the target memory cells. When the foggy program operation and the fine program operation are separately performed, interference between memory cells may be minimized.

Specifically, the target memory cells may be in the erase state ER before the foggy program operation has been performed.

When the foggy program operation and the fine program operation are performed on the target memory cells, the target memory cells may be in the erase state ER and the first to third program states P1 to P3. The first to third program states P1 to P3, after the foggy program operation has been performed, may move in a direction of a higher threshold voltage through the fine program operation. The first to third program states P1 to P3, after the fine program operation has been performed, may have smaller widths than the widths of the first to third program states P1 to P3 right after the foggy program operation has been performed.

In the foggy program operation, a foggy verification voltage may be used to determine whether each of the first to third program states P1 to P3 has been properly formed, that is, is "foggy program pass". The first to third program states P1 to P3 may correspond to first to third foggy verification voltages FPV1 to FPV3, respectively. In other words, the first to third foggy verification voltages FPV1 to FPV3 may be used to verify the first to third program states P1 to P3, respectively.

In the fine program operation, a fine verification voltage may be used to determine whether each of the first to third program states P1 to P3 has been properly formed, that is, is "fine program pass". The first to third program states P1 to P3 may correspond to the first to third verification voltages PV1 to PV3, respectively. The first to third verification voltages PV1 to PV3 may be referred to as first to third fine verification voltages in order to be distinguished from the first to third foggy verification voltages FPV1 to FPV3. Each of the first to third fine verification voltages PV1 to PV3 may be equal to or higher than the corresponding foggy verification voltages FPV1 to FPV3. For example, the first fine verification voltage PV1 may be equal to or higher than the first foggy verification voltage FPV1, and the second fine verification voltage PV2 may be equal to or higher than the second foggy verification voltage FPV2.

Figure 5:
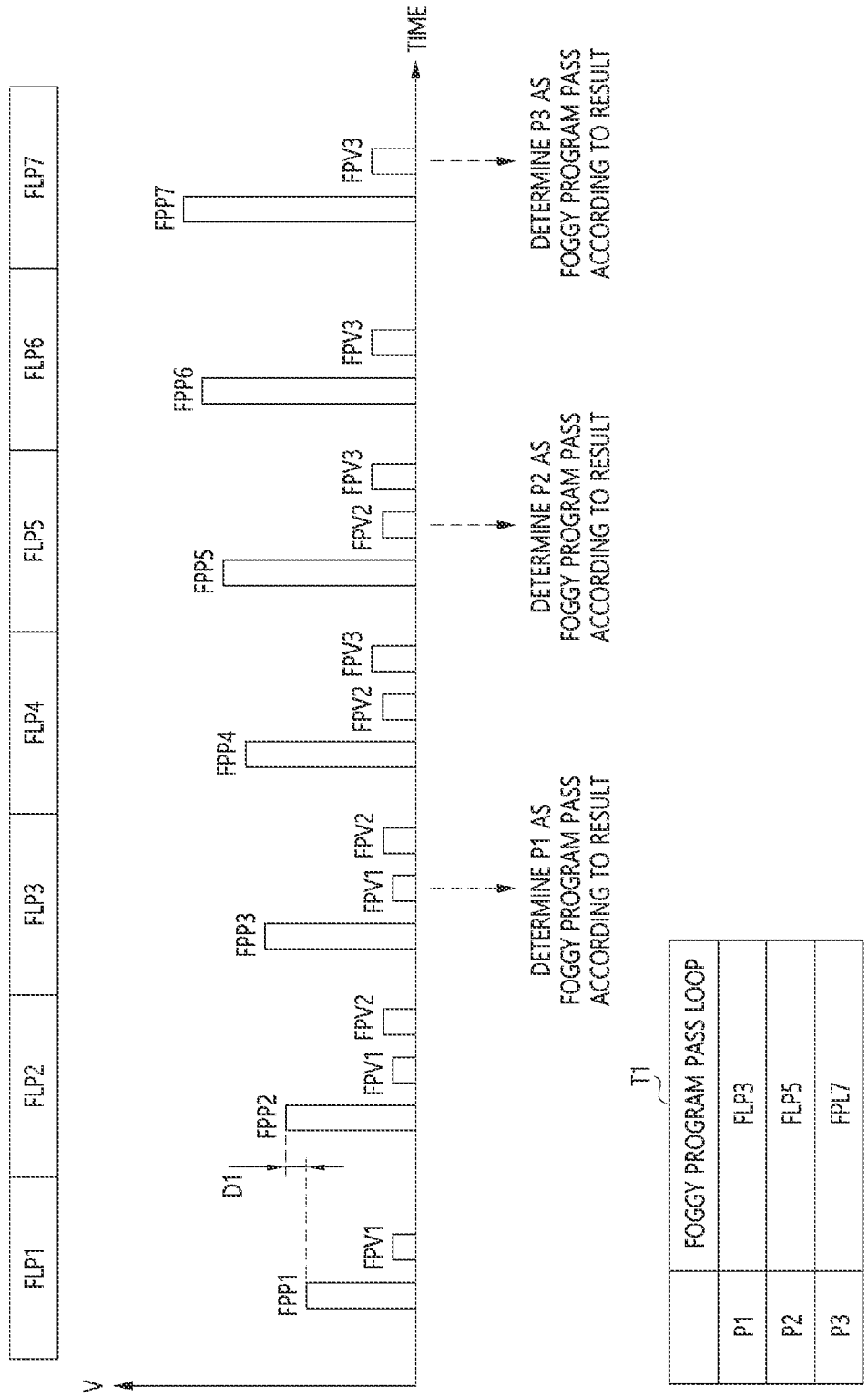
FIG. 5 is a diagram illustrating a foggy program operation according to an ISPP method, according to an embodiment of the present technology.

FIG. 5 is a diagram illustrating the foggy program operation according to an incremental step pulse program (ISPP) method, according to an embodiment of the present technology. In a graph of FIG. 5, a horizontal axis may refer to the passage of time, and a vertical axis V may refer to a voltage level.

Referring to FIG. 5, the foggy program operation may be performed according to the ISPP method. The foggy program operation may include, for example, first to seventh foggy program loops FLP1 to FLP7. First to seventh foggy program voltages FPP1 to FPP7 included in the first to seventh foggy program loops FLP1 to FLP7, respectively, may be applied in such a way that each subsequent foggy program voltage increases by an increase amount D1 in a stepwise manner. Each foggy program loop may include an operation that applies a foggy program voltage and an operation that applies a foggy verification voltage. The operation that applies the foggy program voltage may include an operation that applies the foggy program voltage to a selected word line in order to increase threshold voltages of target memory cells. The operation that applies the foggy verification voltage may include an operation that applies one or more foggy verification voltages to the selected word line in order to check the threshold voltages of the target memory cells.

In each foggy program loop, a bit line control operation may be further performed before the foggy program voltage is applied. The bit line control operation may include an operation that determines program inhibited memory cells and program permitted memory cells, among target memory cells, to be applied later. Each of the program inhibited memory cells may be a target memory cell that should not be affected by the foggy program voltage. In other words, the program inhibited memory cell may be a target memory cell, the threshold voltage of which has to be maintained even though the foggy program voltage is applied to the selected word line. Each of the program permitted memory cells may be a target memory cell, the threshold voltage of which has to be increased by the foggy program voltage.

In addition, the bit line control operation may further include an operation that applies a program inhibiting voltage to bit lines of the program inhibited memory cells (or charges the bit lines of the program inhibited memory cells with the program inhibiting voltage) and applies a program permitting voltage to bit lines of the program permitted memory cells (or charges the bit lines of the program permitted memory cells with the program permitting voltage). The program inhibiting voltage may be higher than the program permitting voltage. For example, the program inhibiting voltage may be a power supply voltage, and the program permitting voltage may be a ground voltage. Since the program inhibiting voltage is applied to the bit lines, the program inhibited memory cells might not be affected by the foggy program voltage applied to the selected word line. In addition, since the program permitting voltage is applied to the bit lines, the program permitted memory cells may be affected by the foggy program voltage applied to the selected word line, and threshold voltages of the program permitted memory cells may increase.

Specifically, the first foggy program loop FLP1 is described as follows. In the bit line control operation before the first foggy program voltage FPP1 has been applied, the program inhibited memory cells and program permitted memory cells may be determined based on program data. More specifically, target memory cells to be maintained in the erased state ER may be determined as the program inhibited memory cells, and target memory cells, which are to be in the first to third program states P1 to P3, may be determined as the program permitted memory cells. When the program inhibited memory cells and the program permitted memory cells have been determined, each of the bit lines BL1 to BLm may be charged with the program inhibiting voltage or the program permitting voltage. In addition, the first foggy program voltage FPP1 may be applied to the selected word line, and the threshold voltages of the program permitted memory cells may increase. Subsequently, "pass" or "fail" may be determined for the target memory cells, which are to be in the first program state P1, according to a result of the operation that applies the first foggy verification voltage FPV1. When more than a predetermined number of target memory cells, among the target memory cells, which are to be in the first program state P1, are determined as "fail", it may be determined that the fine program operation has not been completely performed on the first program state P1.

Subsequently, the second foggy program loop FLP2 may be performed. In the bit line control operation before the second foggy program voltage FPP2 has been applied, the program inhibited memory cells and the program permitted memory cells may be determined. More specifically, the target memory cells determined as "pass" in the first foggy program loop FLP1 may be added as the program inhibited memory cells, and the target memory cells determined as "fail" in the first foggy program loop FLP1 and the target memory cells, which are to be in the second and third program states P2 and P3, may be determined as the program permitted memory cells. When the program inhibited memory cells and the program permitted memory cells have been determined, each of the bit lines BL1 to BLm may be charged with the program inhibiting voltage or the program permitting voltage. In addition, an operation that applies the second foggy program voltage FPP2 and the operation that applies the first foggy verification voltage FPV1 may be performed in the first foggy program loop FLP1 in almost the same manner as described above. Similarly to the first foggy verification voltage FPV1, the second foggy verification voltage FPV2 may be additionally applied to the selected word line. According to a result of the operation that applies the second foggy verification voltage FPV2, "pass" or "fail" may be determined for the target memory cells, which are to be in the second program state P2. When more than a predetermined number of target memory cells, among the target memory cells, which are to be in the second program state P2, are determined as "fail", it may be determined that the fine program operation has not been completely performed on the second program state P2.

Each of the third to seventh foggy program loops FLP3 to FLP7 may be performed in almost the same manner as described above. In the third foggy program loop FLP3, the third foggy program voltage FPP3, the first foggy verification voltage FPV1, and the second foggy verification voltage FPV2 may be applied to the selected word line. According to the result of the operation that applies the first foggy verification voltage FPV1, when less than a predetermined number of target memory cells, among the target memory cells, which are to be in the first program state P1, are determined as "fail", it may be determined that the fine program operation has been completely performed on the first program state P1, that is, the first program state P1 may be determined as "foggy program pass". The first foggy verification voltage FPV1 might not be applied from the fourth foggy program loop FLP4 and onward.

In the fourth foggy program loop FLP4, the fourth foggy program voltage FPP4, the second foggy verification voltage FPV2, and the third foggy verification voltage FPV3 may be applied to the selected word line.

In the fifth foggy program loop FLP5, the fifth foggy program voltage FPP5, the second foggy verification voltage FPV2, and the third foggy verification voltage FPV3 may be applied to the selected word line. According to the result of the operation that applies the second foggy verification voltage FPV2, when less than a predetermined number of target memory cells, among the target memory cells, which are to be in the second program state P2, are determined as "fail", the second program state P2 may be determined as "foggy program pass". The second foggy verification voltage FPV2 might not be applied from the sixth foggy program loop FLP6 and onward.

In the sixth foggy program loop FLP6, the sixth foggy program voltage FPP6 and the third foggy verification voltage FPV3 may be applied to the selected word line.

In the seventh foggy program loop FLP7, the seventh foggy program voltage FPP7 and the third foggy verification voltage FPV3 may be applied to the selected word line. According to a result of the operation that applies the third foggy verification voltage FPV3, when less than a predetermined number of target memory cells, among the target memory cells, which are to be in the third program state P3, are determined as "fail", the third program state P3 may be determined as "foggy program pass", and the foggy program operation may be terminated. Meanwhile, the termination of the foggy program operation in the seventh foggy program loop FLP7 is merely an example, and when the third program state P3 is not determined as "foggy program pass" in the seventh foggy program loop FLP7, an eighth foggy program loop FLP8 may follow.

According to an embodiment, the respective foggy program loops that apply the first to third foggy verification voltages FPV1 to FPV3 may be determined in advance. In FIG. 5, the first to third foggy verification voltages FPV1 to FPV3 may begin being applied in the second, third, and fourth foggy program loops FLP2, FLP3, and FLP4, respectively, but the starting times may vary according to an embodiment.

As described below, the fine program operation may also be performed in the ISPP method. According to the present technology, in order to more efficiently perform the fine program operation, the control circuit 121 may store information regarding a program loop in which at least one $i^{th}$ program state, that is, a target program state, is determined as "foggy program pass", that is, a foggy program pass loop, as illustrated in Table T1. For example, in an example of FIG. 5, since the first to third program states P1 to P3 are determined as "foggy program pass" in the third, fifth, and seventh foggy program loops FLP3, FLP5, and FLP7, respectively, the control circuit 121 may store information regarding the third, fifth, and seventh foggy program loops FLP3, FLP5, and FLP7 as the foggy program pass loops in the first to third program states P1 to P3.

Figure 6:
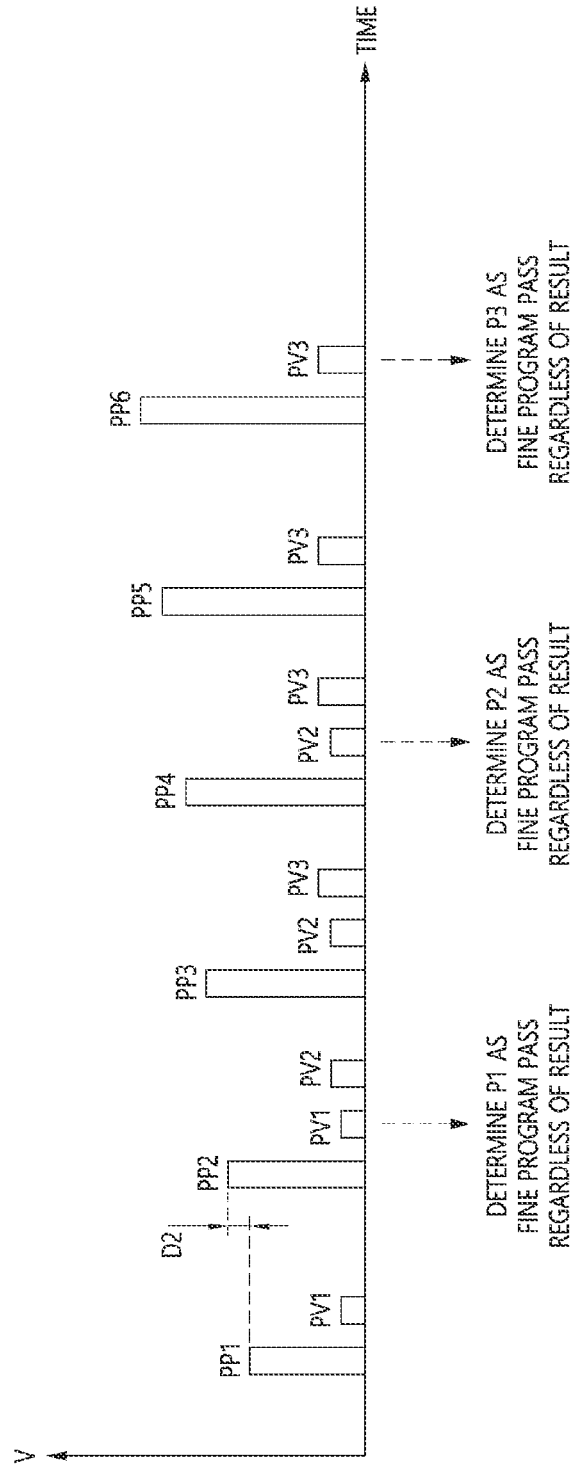
FIG. 6 is a diagram illustrating a method of performing a fine program operation, according to an embodiment of the present technology.

FIG. 6 is a diagram illustrating a method of performing the fine program operation, according to an embodiment of the present technology.

The fine program operation may also be performed based on the ISPP method similarly to the foggy program operation and may include, for example, first to sixth fine program loops LP1 to LP6. First to sixth fine program voltages PP1 to PP6 included in the first to sixth fine program loops LP1 to LP6, respectively, may be applied in such a way that each subsequent fine program voltage increases by an increase amount D2 in a stepwise manner. The increase amount D2 may be different from or equal to the increase amount D1 of FIG. 5.

The control circuit 121 may calculate a fine program pass loop in the $i^{th}$ program state based on the foggy program pass loop in the $i^{th}$ program state. The foggy program pass loop may be an actual result, and the fine program pass loop may be estimated from the foggy program pass loop. The control circuit 121 may determine the $i^{th}$ program state as "fine program pass" in a fine program loop that is equal to or greater than the fine program pass loop in the $i^{th}$ program state.

More specifically, the control circuit 121 may calculate the fine program pass loop in the $i^{th}$ program state Pi based on the Equations 1 and 2, below. In the Equations 1 and 2, the first foggy program voltage FPP1, the first fine program voltage PP1, the increase amount D2 of the fine program voltage, and an $i^{th}$ foggy verification voltage FPVi and an $i^{th}$ fine verification voltage PVi, which correspond to the $i^{th}$ program state Pi, may be predetermined values. ISPP efficiency may be a value known in advance through experiments. A function CEIL[ ] may refer to a ceiling function.

Fine program pass loop in $i^{th}$ program state $Pi =$      Equation 1

CEIL[(first foggy program voltage $FPP1 -$ first fine program voltage $PP1)/$ increase amount of fine program voltage $D2 +$ foggy program pass loop in $i^{th}$ program state $Pi +$ $(i^{th}$ fine verification voltage $PVi -$ $i^{th}$ foggy verification voltage $FPVi)/$ (increase amount of fine voltage $D2/ISPP$ efficiency)]

-continued $$ISPP\ \text{Efficiency} = $$
increase amount of threshold voltage per application of fine program voltage/increase amount of fine program voltage $D2$ Equation 2

For example, as illustrated in Table T2, the control circuit 121 may calculate the foggy program pass loops in the first to third program states P1 to P3 and the fine program pass loops in the first to third program states P1 to P3 based on the Equations 1 and 2. In addition, the control circuit 121 may determine the first program state P1 as "fine program pass" in the fine program pass loop of the first program state P1, that is, the second fine program loop LP2. Specifically, after the second fine program voltage PP2 has been applied, the control circuit 121 may determine the first program state P1 as "fine program pass" regardless of a result of the operation that applies the first fine verification voltage PV1. Target memory cells, which are to be in the first program state P1, may receive only the first and second fine program voltages PP1 and PP2 and might not receive the third to sixth fine program voltages PP3 to PP6.

Similarly, the control circuit 121 may determine the second program state P2 as "fine program pass" in the fine program pass loop of the second program state P2, that is, the fourth fine program loop LP4. After the fourth fine program voltage PP4 has been applied, the control circuit 121 may determine the second program state P2 as "fine program pass" regardless of a result of the operation that applies the second fine verification voltage PV2. Target memory cells, which are to be in the second program state P2, may receive only the first to fourth fine program voltages PP1 to PP4 and might not receive the fifth and sixth fine program voltages PP5 and PP6.

Similarly, the control circuit 121 may determine the third program state P3 as "fine program pass" in the fine program pass loop of the third program state P3, that is, the sixth fine program loop LP6. After the sixth fine program voltage PP6 has been applied, the control circuit 121 may determine the third program state P3 as "fine program pass" regardless of a result of the operation that applies the third fine verification voltage PV3 and may terminate the fine program operation.

According to an embodiment, when the first foggy program voltage FPP1 is the same as the first fine program voltage PP1, Equation 1 may be arranged into the following Equation 3.

Fine program pass loop in $i^{th}$ program state $Pi =$    Equation 3

CEIL[foggy program pass loop in $i^{th}$ program state $Pi +$ $(i^{th}$ fine verification voltage $PVi -$ $i^{th}$ foggy verification voltage $FPVi)$/(increase amount of fine program voltage $D2/ISPP$ efficiency)]

Figure 7:
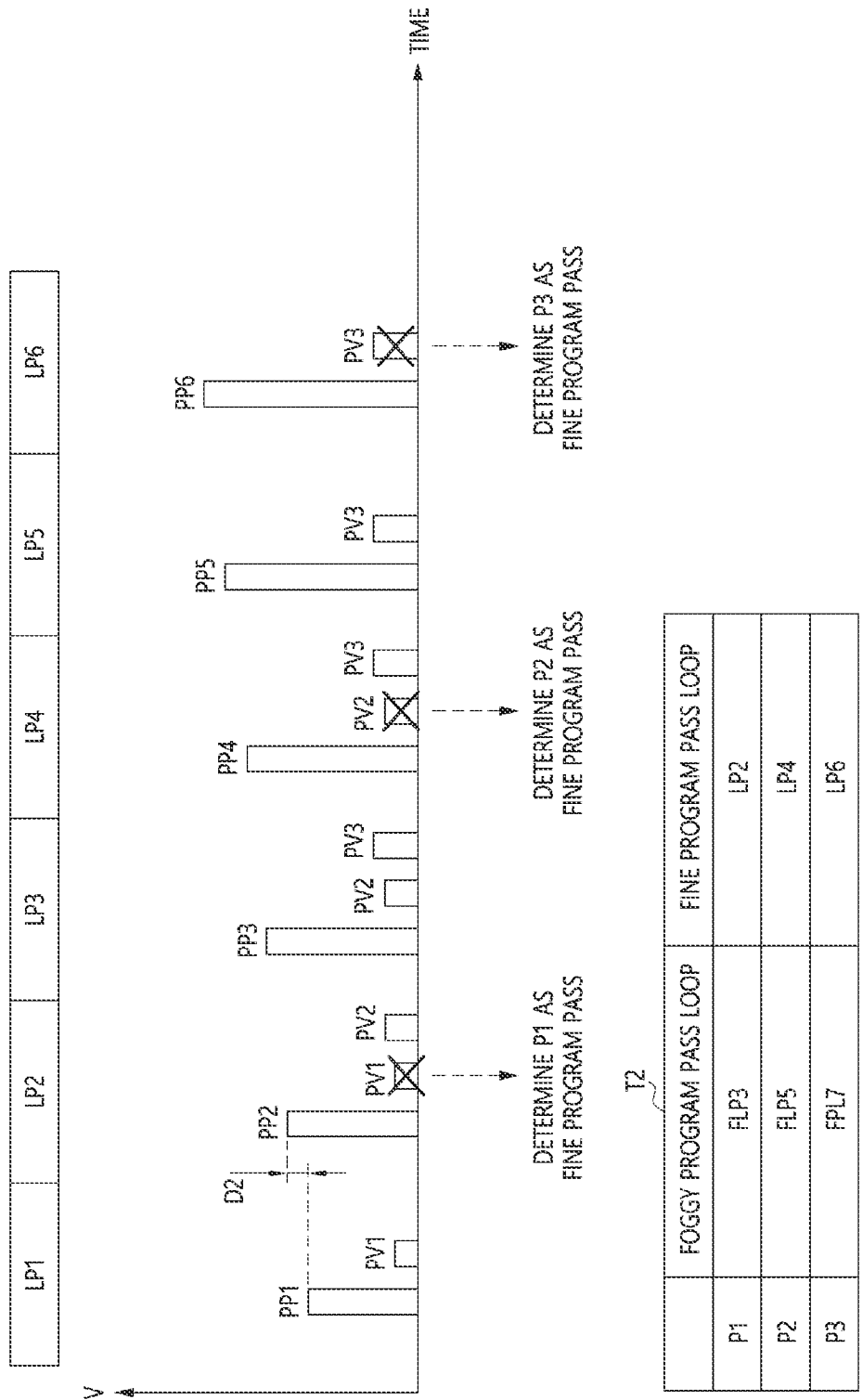
FIG. 7 is a diagram illustrating a method of performing a fine program operation, according to an embodiment of the present technology.

FIG. 7 is a diagram illustrating a method of performing the fine program operation, according to an embodiment of the present technology.

Referring to FIG. 7, the control circuit 121 may determine the first program state P1 as "fine program pass" in the fine program pass loop of the first program state P1, that is, the second fine program loop LP2. However, unlike the method of FIG. 6, the control circuit 121 may determine the first program state P1 as "fine program pass" without performing the operation that applies the first fine verification voltage PV1 after the second fine program voltage PP2 has been applied. That is, the operation that applies the first fine verification voltage PV1 may be skipped after the second fine program voltage PP2 has been applied.

Similarly, after the fourth fine program voltage PP4 has been applied, the control circuit 121 may determine the second program state P2 as "fine program pass" without performing the operation that applies the second fine verification voltage PV2. In addition, the control circuit 121 may determine the third program state P3 as "fine program pass" without performing the operation that applies the third fine verification voltage PV3 after the sixth fine program voltage PP6 has been applied.

Figure 8:
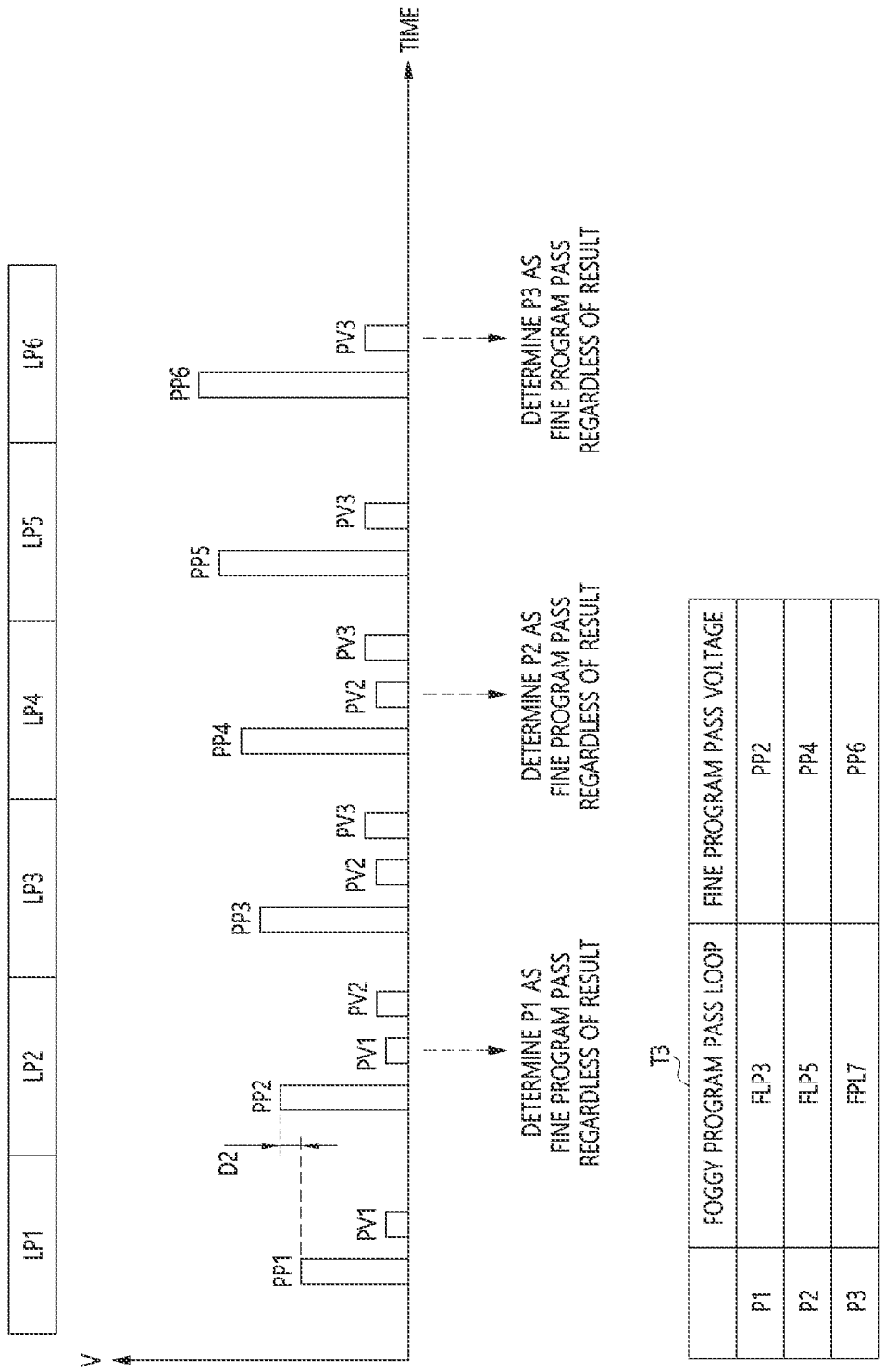
FIG. 8 is a diagram illustrating a method of performing a fine program operation, according to an embodiment of the present technology.

FIG. 8 is a diagram illustrating a method of performing the fine program operation, according to an embodiment of the present technology.

Referring to FIG. 8, the control circuit 121 may calculate the fine program pass voltage of the $i^{th}$ program state based on the foggy program pass loop in the $i^{th}$ program state. After the fine program pass voltage of the $i^{th}$ program state has been applied to the selected word line as the fine program voltage, the control circuit 121 may determine the $i^{th}$ program state as "fine program pass". More specifically, the control circuit 121 may calculate the fine program pass voltage of the $i^{th}$ program state Pi based on Equation 4 below.

Fine program pass voltage of $i^{th}$ program state $Pi =$    Equation 4

CEIL[(first foggy program voltage $FPP1 +$ foggy program pass loop in $i^{th}$ program state $Pi *$ increase amount of foggy program voltage $D1 +$ $(i^{th}$ fine verification voltage $PVi -$ $i^{th}$ foggy verification voltage $FPVi)/ISPP$ efficiency]

For example, as illustrated in Table T3, the control circuit 121 may calculate the foggy program pass loops in the first to third program states P1 to P3 and the fine program pass voltages in the first to third program states P1 to P3 based on Equations 4 and 2. The control circuit 121 may determine the first program state P1 as "fine program pass" after applying the fine program pass voltage of the first program state P1, that is, the second fine program voltage PP2. Similarly, the control circuit 121 may determine the second program state P2 as "fine program pass" after applying the fourth fine program voltage PP4 and may determine the third program state P3 as "fine program pass" after applying the sixth fine program voltage PP6.

Meanwhile, in FIG. 8, the operation that applies a fine verification voltage corresponding to each program state may be performed after the operation that applies a fine program pass voltage of each program state. However, as described with reference to FIG. 7, the operation that applies the fine verification voltage corresponding to each program state after the operation that applies the fine program pass voltage of each program state may be skipped.

In summary, according to the present technology, the memory device 100 may effectively predict the fine program pass condition by considering variables of the foggy program pass loops and the program operation. The memory device 100 may determine each program state as "fine program pass" when the fine program pass condition has been satisfied, thereby omitting an unnecessary operation that applies the fine program voltage and an unnecessary operation that applies the fine verification voltage on the target memory cells. Accordingly, execution time and power consumption of the program operation may be reduced, which makes it possible to greatly improve operating performance of the memory device 100.

Figure 9:
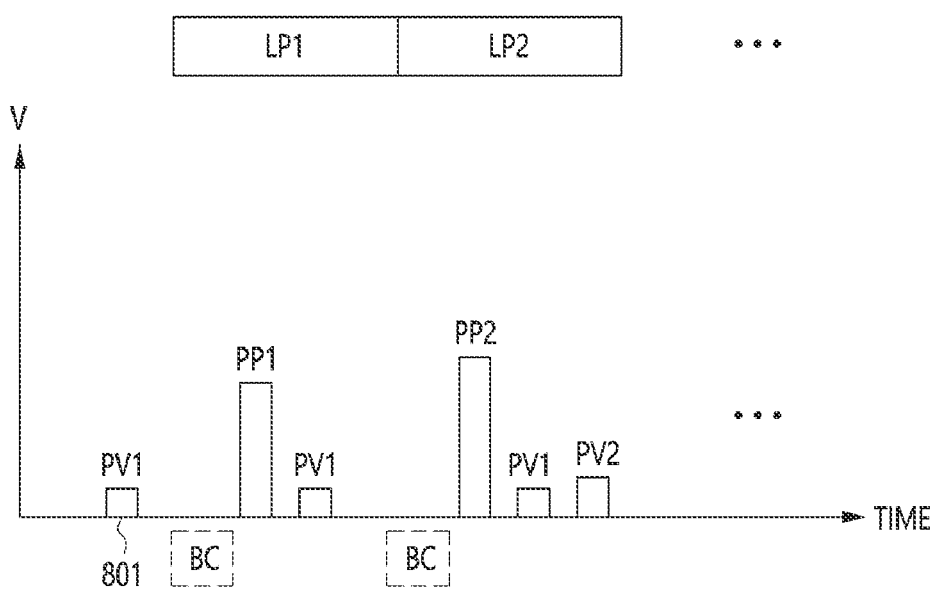
FIG. 9 is a diagram illustrating a method of performing a fine program operation, according to an embodiment of the present technology.

FIG. 9 is a diagram illustrating a method of performing the fine program operation, according to an embodiment of the present technology.

Referring to FIG. 9, as a result of the foggy program operation performed before the fine program operation, a target memory cell in the first program state P1 with a threshold voltage higher than the first fine verification voltage PV1 may be already present. In order to determine the target memory cell as a program inhibited memory cell, an operation 801 that pre-applies the first fine verification voltage PV1 may be performed before the first fine program loop LP1. The control circuit 121 may determine the target memory cell being already in the first program state P1 as "pass" based on a result of the operation 801 that pre-applies the first fine verification voltage PV1. The control circuit 121 may determine the target memory cell, which has been determined as "pass", as the program inhibited memory cell in the bit line control operation BC performed before the first fine program voltage PP1 is applied.

Therefore, according to the present technology, even though the first fine program voltage PP1 is applied to be higher than the first foggy program voltage FPP1 in order to reduce the execution time of the fine program operation, target memory cell in the first program state P1 may be determined as the program inhibited memory cell through the operation 801 that pre-applies the first fine verification voltage PV1, which makes it possible to prevent the threshold voltage of the corresponding target memory cell from excessively increasing.

Figure 10:
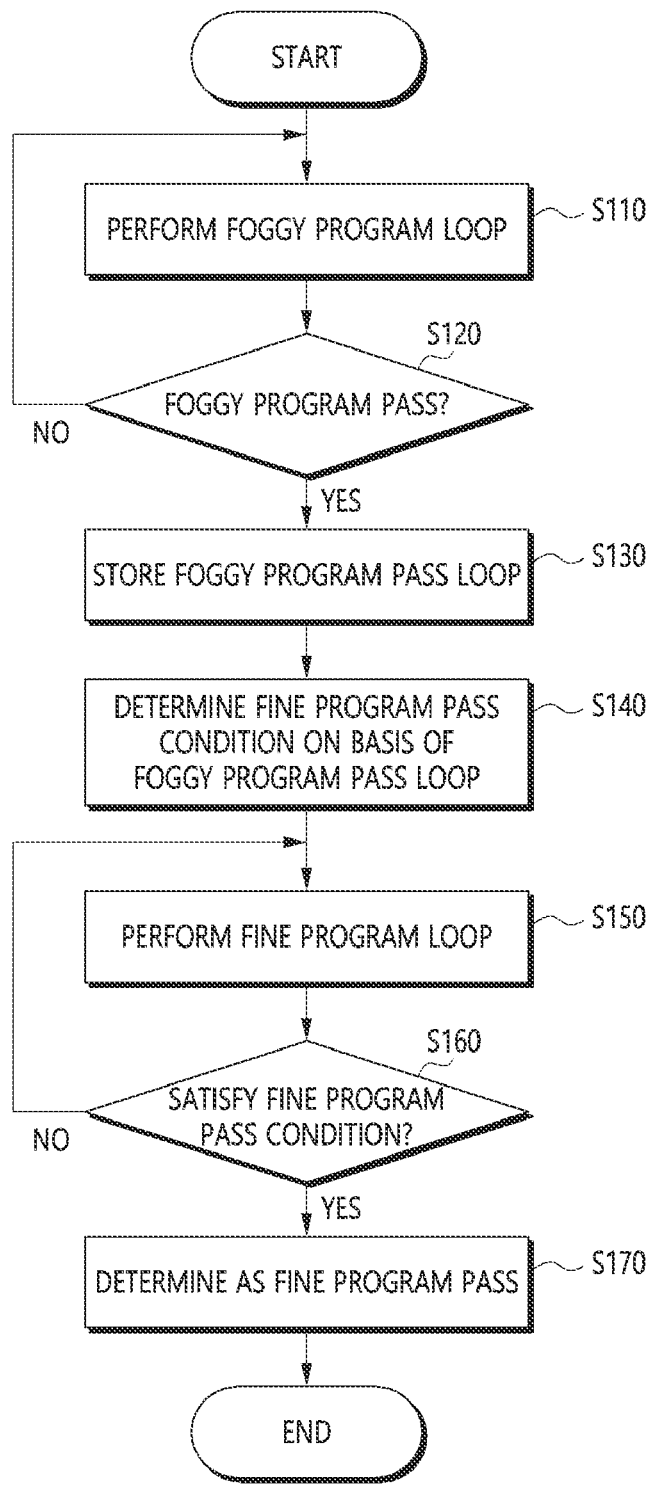
FIG. 10 is a flowchart illustrating an operating method of a memory device, according to an embodiment of the present technology.

FIG. 10 is a flowchart illustrating an operating method of the memory device 100, according to an embodiment of the present technology. FIG. 10 may illustrate a procedure for performing the program operation to be programmed to a target program state. Accordingly, the procedure, illustrated in FIG. 10, may be applied to each of the first to third program states P1 to P3.

Referring to FIG. 10, in step S110, the memory device 100 may perform a foggy program loop on the target program state in the foggy program operation for a selected word line. That is, the memory device 100 may perform an operation that applies a foggy program voltage on target memory cells to be in the target program state and an operation that applies a foggy verification voltage corresponding to the target program state.

In step S120, the memory device 100 may determine whether the target program state is "foggy program pass" based on a result of the operation that applies the foggy verification voltage. When it is determined that the target program state is not "foggy program pass", the procedure may proceed to step S110. Accordingly, the memory device 100 may perform a subsequent foggy program loop on the target program state. However, when the target program state is determined as "foggy program pass", the procedure may proceed to step S130.

In step S130, the memory device 100 may store information regarding a current foggy program loop as a foggy program pass loop.

In step S140, the memory device 100 may determine a fine program pass condition based on the foggy program pass loop.

In step S150, the memory device 100 may perform a fine program loop in a fine program operation on the selected word line.

In step S160, the memory device 100 may determine whether the fine program pass condition has been satisfied for the target program state. The satisfying of the fine program pass condition may include performing a fine program pass loop. The satisfying of the fine program pass condition may include applying a fine program pass voltage to the selected word line. When it is determined that the fine program pass condition has not been satisfied, the procedure may proceed to step S150. Accordingly, the memory device 100 may perform a next fine program loop on the target program state. However, when it is determined that the fine program pass condition has been satisfied, the procedure may proceed to step S170.

In step S170, the memory device 100 may determine the target program state as "fine program pass". Therefore, the next fine program loop might not be performed on the target program state.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A memory device comprising:
memory cells connected to a selected word line; and
a peripheral circuit configured to:
    store, as a foggy program pass loop for a target program state, information regarding an Xth foggy program loop in which the target program state is determined as foggy program pass during a foggy program operation including one or more foggy program loops for the selected word line;
    before performing a fine program operation including one or more fine program loops for the selected word line, determine, according to a predetermined relationship based on the foggy program pass loop, a Yth fine program loop as a fine program pass loop for the target program state; and
    determine the target program state as a fine program pass in the fine program pass loop during the fine program operation, regardless of states of the memory cells.

2. The memory device according to claim 1, wherein the peripheral circuit determines the fine program pass loop based on at least one of the foggy program pass loop, a predetermined first foggy program voltage, a first fine program voltage, an increase amount of a fine program voltage, a foggy verification voltage and a fine verification voltage of the target program state, and Incremental Step Pulse Program (ISPP) efficiency.

3. The memory device according to claim 1, wherein the peripheral circuit applies a fine program voltage and a fine verification voltage to the selected word line in the fine program pass loop and then determines the target program state as the fine program pass regardless of whether the target program state is determined as the fine program pass or a fine program fail resulting from application of the fine verification voltage.

4. The memory device according to claim 1, wherein the peripheral circuit applies a fine program voltage in the fine program pass loop and then determines the target program state as the fine program pass without applying a fine verification voltage to the selected word line to verify the target program state.

5. The memory device according to claim 1, wherein a first fine program voltage of the fine program operation is higher than a first foggy program voltage of the foggy program operation.

6. The memory device according to claim 1, wherein before applying a first fine program voltage to the selected word line during the fine program operation, the peripheral circuit performs an operation that pre-applies a first fine verification voltage to verify a first program state and determines a memory cell in the first program state as a program inhibited memory cell based on a result of the operation that pre-applies the first fine verification voltage.

7. A memory device comprising:
memory cells connected to a selected word line; and
a peripheral circuit configured to:
store, as a foggy program pass loop for a target program state, information regarding an Xth foggy program loop in which the target program state is determined as foggy program pass during a foggy program operation including one or more foggy program loops for the selected word line;
before performing a fine program operation including one or more fine program loops for the selected word line, determine a fine program pass voltage for the target program state according to a predetermined relationship based on the foggy program pass loop; and
determine the target program state as a fine program pass after applying the fine program pass voltage to the selected word line during the fine program operation, regardless of states of the memory cells.

8. The memory device according to claim 7, wherein the peripheral circuit determines the fine program pass voltage based on at least one of the foggy program pass loop, a predetermined first foggy program voltage, an increase amount of a foggy program voltage, a foggy verification voltage and a fine verification voltage of the target program state, and Incremental Step Pulse Program (ISPP) efficiency.

9. The memory device according to claim 7, the peripheral circuit applies the fine program pass voltage and a fine verification voltage to the selected word line, and then determines the target program state as the fine program pass regardless of whether the target program state is determined as the fine program pass or a fine program fail resulting from application of the fine verification voltage.

10. The memory device according to claim 7, wherein the peripheral circuit applies the fine program pass voltage, and then determines the target program state as the fine program pass without applying a fine verification voltage to the selected word line to verify the target program state.

11. The memory device according to claim 7, wherein a first fine program voltage of the fine program operation is higher than a first foggy program voltage of the foggy program operation.

12. The memory device according to claim 7, wherein before applying a first fine program voltage to the selected word line during the fine program operation, the peripheral circuit performs an operation that pre-applies a first fine verification voltage to verify a first program state and determines a memory cell in the first program state as a program inhibited memory cell based on a result of the operation that pre-applies the first fine verification voltage.

13. A method of operating a memory device, the method comprising:
storing, as a foggy program pass loop for a target program state, information regarding an Xth foggy program loop in which the target program state is determined as foggy program pass during a foggy program operation including one or more foggy program loops for a selected word line connected to memory cells;
determining a fine program pass condition for the target program state according to a predetermined relationship based on the foggy program pass loop before performing a fine program operation including one or more fine program loops for the selected word line; and
determining the target program state as a fine program pass when the fine program pass condition is satisfied during a fine program operation, regardless of states of the memory cells.

14. The method according to claim 13, wherein the fine program pass condition comprises performing a Yth fine program loop during the fine program operation.

15. The method according to claim 14, wherein determining the fine program pass condition comprises determining the Yth fine program loop based on at least one of the foggy program pass loop, a predetermined first foggy program voltage, a first fine program voltage, an increase amount of a fine program voltage, a foggy verification voltage and a fine verification voltage of the target program state, and Incremental Step Pulse Program (ISPP) efficiency.

16. The method according to claim 13, wherein the fine program pass condition comprises applying a fine program pass voltage to the selected word line during the fine program operation.

17. The method according to claim 16, wherein determining the fine program pass condition comprises determining the fine program pass voltage based on at least one of the foggy program pass loop, a predetermined first foggy program voltage, an increase amount of a foggy program voltage, a foggy verification voltage and a fine verification voltage of the target program state, and Incremental Step Pulse Program (ISPP) efficiency.

* * * * *